(12) United States Patent
Jo et al.

(10) Patent No.: US 10,632,985 B2
(45) Date of Patent: Apr. 28, 2020

(54) HYBRID VEHICLE AND METHOD OF PREDICTING DRIVING PATTERN IN THE SAME

(71) Applicants: HYUNDAI MOTOR COMPANY, Seoul (KR); KIA MOTORS CORPORATION, Seoul (KR)

(72) Inventors: Kyu Hwan Jo, Seoul (KR); Joon Young Park, Seoul (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 215 days.

(21) Appl. No.: 15/712,538

(22) Filed: Sep. 22, 2017

(65) Prior Publication Data

US 2018/0186360 A1 Jul. 5, 2018

(30) Foreign Application Priority Data

Dec. 29, 2016 (KR) .......................... 10-2016-0182175

(51) Int. Cl.
| | |
|---|---|
| *B60L 9/00* | (2019.01) |
| *B60W 20/11* | (2016.01) |
| *B60W 10/08* | (2006.01) |
| *B60W 50/08* | (2020.01) |
| *B60W 40/09* | (2012.01) |
| *G06F 17/00* | (2019.01) |

(Continued)

(52) U.S. Cl.
CPC ............ *B60W 20/11* (2016.01); *B60W 10/08* (2013.01); *B60W 20/15* (2016.01); *B60W 40/09* (2013.01); *B60W 50/0097* (2013.01); *B60W 50/08* (2013.01); *G06F 17/00* (2013.01); *B60W 2050/0088* (2013.01); *B60W 2540/10* (2013.01); *B60W 2540/12* (2013.01); *B60W 2550/10* (2013.01); *B60W 2550/402* (2013.01); *B60W 2720/103* (2013.01); *G01P 15/00* (2013.01)

(58) Field of Classification Search
CPC ....... B60W 20/11; B60W 20/15; B60W 10/08
See application file for complete search history.

(56) References Cited

U.S. PATENT DOCUMENTS

| | | |
|---|---|---|
| 9,361,272 B2 | 6/2016 | Syed et al. |
| 2008/0120025 A1 | 5/2008 | Naitou et al. |

(Continued)

FOREIGN PATENT DOCUMENTS

| | | |
|---|---|---|
| JP | 2008-003707 A | 1/2008 |
| JP | 2008068739 | 3/2008 |

(Continued)

OTHER PUBLICATIONS

Notice of Allowance for Korean Application No. 10-2016-0182175 dated Jul. 13, 2018 (5 pages).

*Primary Examiner* — Adam M Alharbi
(74) *Attorney, Agent, or Firm* — Brinks Gilson & Lione

(57) ABSTRACT

The present disclosure provides a hybrid vehicle and a method of predicting a driving pattern in the same. The method includes: acquiring current vehicle driving information, determining an upcoming event and a driving style based on the current vehicle driving information, and generating an acceleration/deceleration prediction value based on a prediction model corresponding to the upcoming event and the driving style selected from a plurality of pre-learned prediction models.

9 Claims, 7 Drawing Sheets

(51) Int. Cl.
*B60W 20/15* (2016.01)
*B60W 50/00* (2006.01)
*G01P 15/00* (2006.01)

(56) References Cited

U.S. PATENT DOCUMENTS

| | | | |
|---|---|---|---|
| 2014/0358841 A1* | 12/2014 | Ono | G08G 1/0112 |
| | | | 706/52 |
| 2015/0051785 A1 | 2/2015 | Pal et al. | |
| 2015/0213555 A1 | 7/2015 | Barfield, Jr. et al. | |
| 2015/0217775 A1 | 8/2015 | Ono | |
| 2017/0218862 A1* | 8/2017 | Dufford | B60W 10/06 |

FOREIGN PATENT DOCUMENTS

| | | |
|---|---|---|
| JP | 2010-092424 A | 4/2010 |
| KR | 1020130074193 | 7/2013 |
| KR | 1020140099056 | 8/2014 |
| KR | 10-2014-0140845 A | 12/2014 |
| KR | 101765635 B | 8/2017 |

\* cited by examiner

HYBRID VEHICLE AND METHOD OF PREDICTING DRIVING PATTERN IN THE SAME

CROSS-REFERENCE TO RELATED APPLICATION

The present application claims priority to and the benefit of Korean Patent Application No. 10-2016-0182175, filed on Dec. 29, 2016, which is incorporated herein by reference in its entirety.

FIELD

The present disclosure relates to a hybrid vehicle and a method of predicting a driving pattern, and more particularly to a method of predicting a driving pattern, which is capable of learning a driver's driving pattern and more accurately predicting the driving pattern, and a hybrid vehicle that is capable of performing the same.

BACKGROUND

The statements in this section merely provide background information related to the present disclosure and may not constitute prior art.

Recently, with an increasing demand for improvement of fuel efficiency of vehicles and stringent regulations on emissions from vehicles in many countries, the demand for environmentally friendly vehicles has been increased. In order to meet this demand, hybrid electric vehicles (HEVs) and plug-in hybrid electric vehicles (PHEVs) have been developed.

A hybrid vehicle runs using two power sources including an engine and a motor. Depending on harmonious operation of the engine and the motor, optimal output and torque may be generated. Specifically, in the case of a hybrid vehicle equipped with a parallel-type (or transmission-mounted-electric-device-type (TMED-type)) hybrid system, in which an electric motor and an engine clutch (EC) are installed between an engine and a transmission, the output of the engine and the output of the motor may be transmitted to a driving shaft simultaneously.

Compared to a vehicle equipped with general internal combustion engine, a hybrid vehicle has more factors to be determined and controlled in order to achieve efficient driving, for example, whether to perform engagement of an engine clutch, whether to apply a motor output to an engine output, and whether to change a driving mode. If a driver's behavior in the near future (e.g. within 10 seconds) can be predicted, more efficient driving may be realized.

In order to predict a driver's behavior, research on a method of sampling driver's driving patterns using a machine-learning method and of updating the samples through learning has been actively conducted. However, this method does not reflect respective drivers' peculiarities. That is, in the case in which a single prediction model is generated based on acquisition of driving data of a plurality of drivers and learning of the drivers' patterns, prediction accuracy may greatly vary depending on drivers' peculiarities. This will now be explained with reference to FIGS. 1 and 2.

FIGS. 1 and 2 are views for explaining respective problems with conventional learning of a driver's patterns.

First, referring to FIG. 1, it can be seen that a driver A decelerates in advance before the vehicle approaches a speed camera and a driver B decelerates suddenly when the vehicle closely approaches a speed camera. In the case in which learning of a driving pattern is conducted based on samples derived from these two drivers, the calculated prediction result merely corresponds to an intermediate value, which is a simple mean value of the sample values. Therefore, the prediction model generated through this method is not actually suitable for either of the two drivers.

This problem may also occur even when learning of a driving pattern is conducted based on samples derived from one driver, who decelerates suddenly when the vehicle has almost reached a tollgate but decelerates well in advance of a speed camera, as shown in FIG. 2.

Therefore, we have discovered that a conventional learning scheme, which does not reflect respective drivers' peculiar driving patterns with respect to the same or different upcoming events, may not accurately predict a driver's intention to accelerate or decelerate in the near future.

SUMMARY

An object of the present disclosure is to provide a method of predicting a driving pattern more efficiently in a hybrid vehicle and a hybrid vehicle that is capable of performing the same.

Another object of the present disclosure is to provide a method of predicting a driving pattern in a hybrid vehicle considering an upcoming event and a hybrid vehicle that is capable of performing the same.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of predicting a driving pattern in a hybrid vehicle includes: acquiring current vehicle driving information, determining an upcoming event and a driving style based on the current vehicle driving information, and generating an acceleration/deceleration prediction value based on a prediction model corresponding to the upcoming event and the driving style selected from a plurality of pre-learned prediction models.

In another aspect of the present disclosure, a hybrid vehicle includes a driving information detection unit configured to detect, with at least one sensor, driving information based on traveling of the hybrid vehicle, and an acceleration/deceleration prediction unit configured to generate an acceleration/deceleration prediction value based on the driving information utilizing an acceleration/deceleration prediction model and traveling conditions of the hybrid vehicle. The driver acceleration/deceleration prediction unit is configured to determine an upcoming event and a driving style based on current vehicle driving information detected by the driving information detection unit, and generate the acceleration/deceleration prediction value based on a prediction model corresponding to the upcoming event and the driving style selected from a plurality of pre-learned prediction models.

Further areas of applicability will become apparent from the description provided herein. It should be understood that the description and specific examples are intended to for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
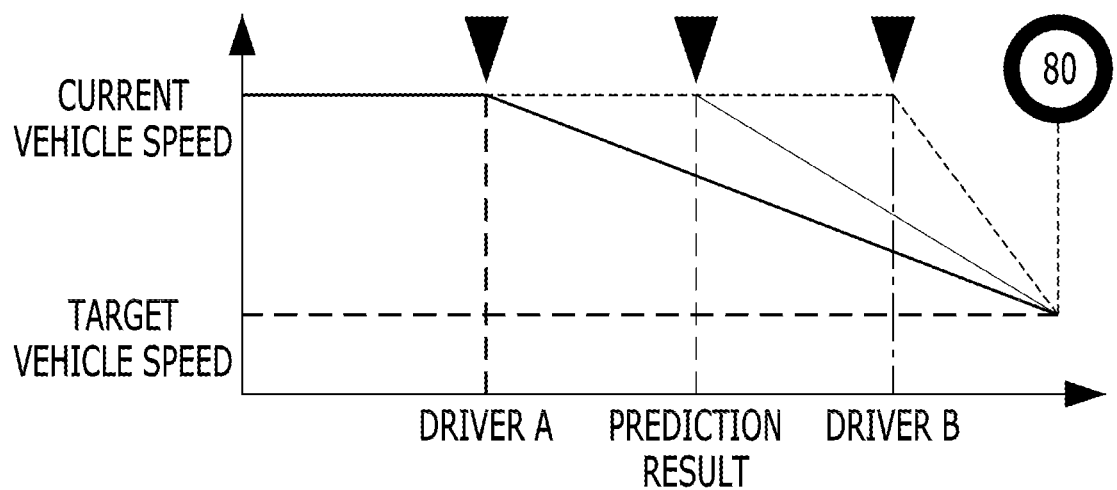
FIGS. 1 and 2 are views for explaining respective problems with conventional learning of a driver's patterns.
Figure 2:
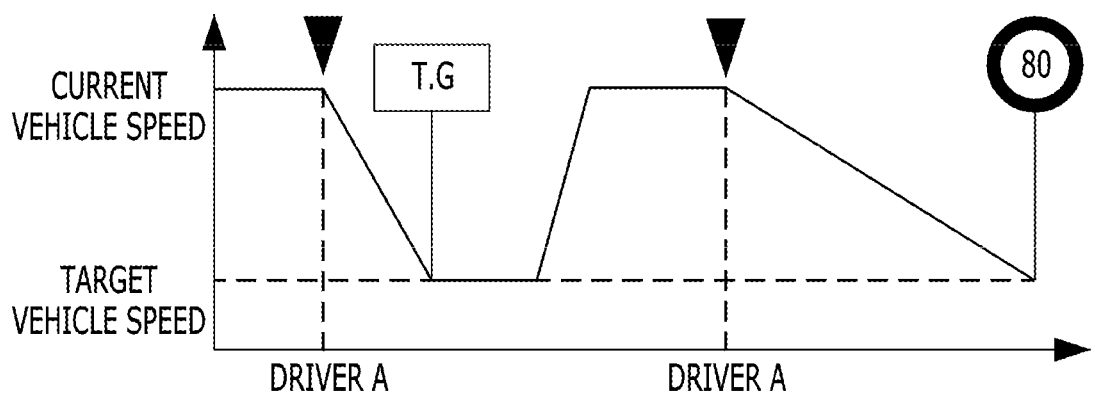

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

First, the structure of a hybrid vehicle will be described with reference to FIG. 3.

Figure 3:
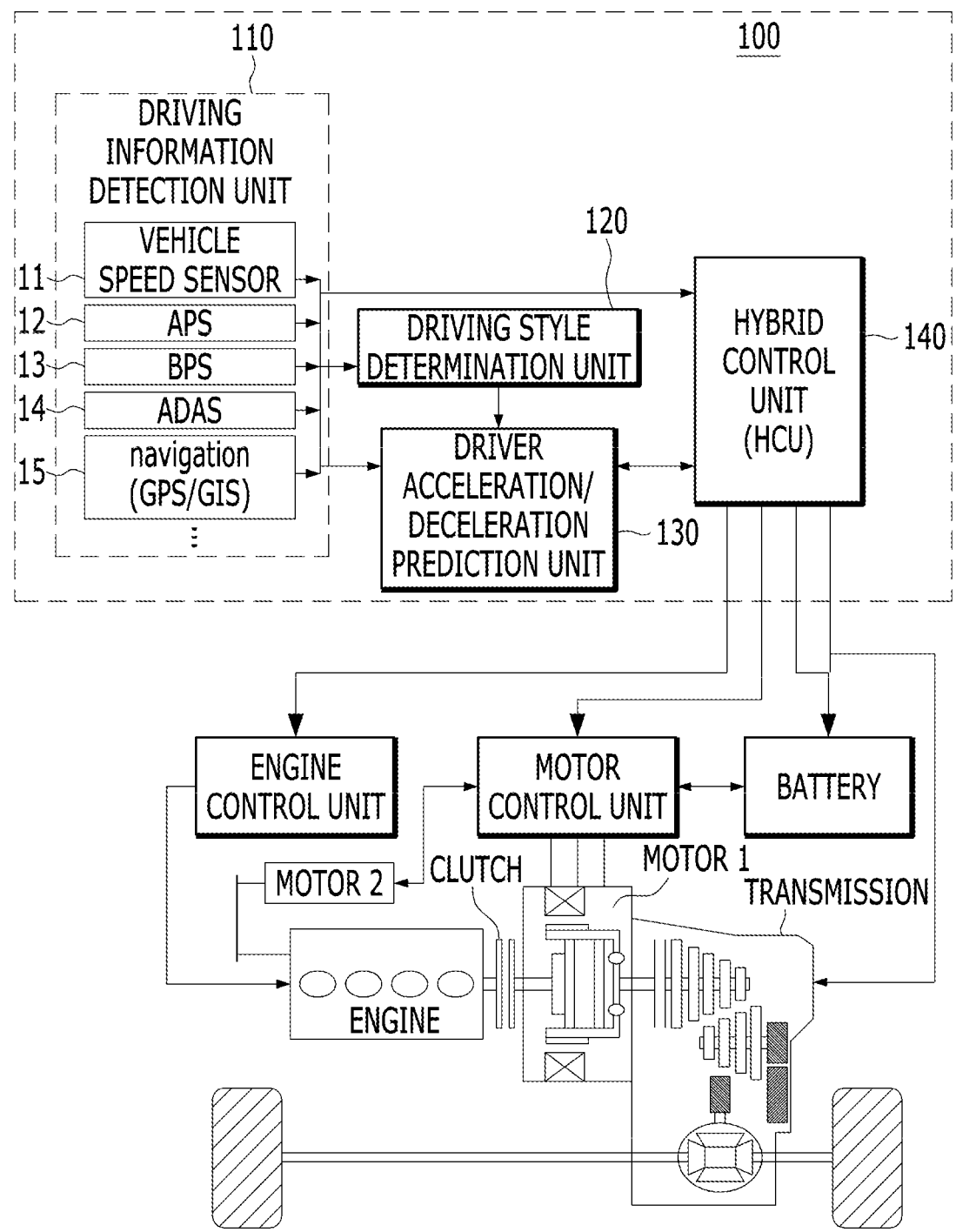
FIG. 3 is a block diagram schematically illustrating a powertrain control system of a hybrid vehicle.

FIG. 3 is a block diagram schematically illustrating a powertrain control system of a hybrid vehicle in some forms of the present disclosure.

Referring to FIG. 3, a powertrain control system 100 of the hybrid vehicle in some forms of the present disclosure includes a driving information detection unit 110, a driving style determination unit 120, a driver acceleration/deceleration prediction unit 130, and a hybrid control unit (HCU) 140. This construction is merely illustrative, and a greater or smaller number of components may compose the powertrain control system (e.g. the driving style determination unit may be omitted).

The driving information detection unit 110 detects driving information related to the traveling of the vehicle, in association with at least one of a vehicle speed sensor 11, an accelerator position sensor (APS) 12, a brake pedal sensor (BPS) 13, an advanced driver assistance system (ADAS) 14, and a navigation device 15.

The driving information detection unit 110 detects the accelerator operation state through the APS 12, and detects the brake operation state through the BPS 13.

The driving information detection unit 110 detects the vehicle speed through the vehicle speed sensor 11, and detects information about movement ahead of the vehicle, which includes the relative distance to the foregoing vehicle and the state of acceleration, through radar sensors or (stereo) cameras of the ADAS 14. Besides the radar sensors or cameras, various other sensors, for example, using ultrasonic waves or lasers, may be employed in accordance with the constitution of the ADAS.

The driving information detection unit 110 detects navigation information (road environment information) such as, for example, a vehicle position based on GPS/GIS, a road type, a congestion degree, a speed limit, an intersection, a tollgate, a turn, and a slope, through the navigation device 15. Here, the navigation device 15 may refer to the navigation map stored therein and traffic information collected through external wireless communication (e.g. telematics or TPEG) in order to provide the above information.

The driving style determination unit 120 determines a driver's driving style based on driving patterns such as, for example, an average vehicle speed, variation in the accelerator dAPS, and variation in the brake pedal dBPS, which are caused by a driver's driving operation.

For example, the driving style determination unit 120 includes a fuzzy membership function using the factors detected by the driving information detection unit 110, which include the variation in the APS, the variation in the BPS, the vehicle speed and the inclination, as input parameters, and calculates a short-term driving style index (SI=0 to 100%).

The driving style determination unit 120 may divide the calculated short-term driving style index (SI=0 to 100%) by a predetermined reference percentage in accordance with the degree of driving style, thereby enabling the driver's driving style to be one of a plurality of levels.

The driver acceleration/deceleration prediction unit 130 learns an acceleration/deceleration prediction model depending on the driving style utilizing a machine-learning scheme, and generates a predictive value of driver's intention of accelerating/decelerating in the near future, which reflects the traveling conditions of the vehicle and the driving style, using the acceleration/deceleration prediction model. That is, the driver acceleration/deceleration prediction unit 130 uses the vehicle speed, the radar information and the navigation information, which are detected by the driving information detection unit 110, and the driver's driving style as input parameters, and quantitatively digitizes a driving operation form that is shown in a comparatively short time unit, thereby determining the driver's momentary intention of accelerating/decelerating and consequently generating a predictive value of driver's acceleration/deceleration in the near future. This acceleration/deceleration predictive value may include a force and a probability of pressing the accelerator or the brake pedal, broken down into predetermined units of time, in the near future.

The concrete prediction algorithm of the acceleration/deceleration prediction unit 130 may include a neural network that makes up for the pre-generated prediction model utilizing the machine-learning scheme, which will be described in detail later.

The HCU 140 controls the operation of the components for switching modes of the hybrid vehicle in some forms of the present disclosure, and serves as a primary control unit that integrally controls an engine control unit and a motor control unit, which are connected thereto over a network.

The HCU 140 may analyze a currently required torque of the driver based on variation in the APS or BPS that is detected by the driving information detection unit 110, and may receive the near-future acceleration/deceleration predictive value, thereby predicting a required torque or the degree of acceleration/deceleration at a specific point of time in the near future.

Further, the HCU may compare the currently required torque and the required torque in the near-future with a variety of threshold values, and may determine whether to shift the gears of the transmission, whether to change the mode (e.g. from the HEV mode to the EV mode or vice versa), and whether to control the engine to operate under full-load or partial-load conditions. The determination result may be output in the form of a control command, which is transmitted to a corresponding control unit.

Of course, depending on the forms of the present disclosure, in the case in which the acceleration/deceleration prediction unit 130 also predicts a near-future required torque using the near-future acceleration/deceleration predictive value, the acceleration/deceleration prediction unit 130 may transmit the near-future required torque predictive value to the HCU 140.

Further, a transmission control unit performs a determination of a change of speed depending on the currently required torque, and allows the HCU 140 to perform a determination of a change of speed depending on the near-future required torque predictive value. The result of determination of a change of speed, which is performed by the HCU 140, is transmitted to the transmission control unit so as to override the determination of a change of speed of the transmission control unit.

The above-described forms may be alternatively constituted such that the driving style determination unit 120 is omitted. In this case, the driver acceleration/deceleration prediction unit 130 may perform acceleration/deceleration prediction without input values related to the driving style.

Hereinafter, a method of predicting the driver's intention of accelerating/decelerating using the driver acceleration/deceleration prediction unit 130 will be described with reference to FIGS. 4A and 4B.

Figure 4A:
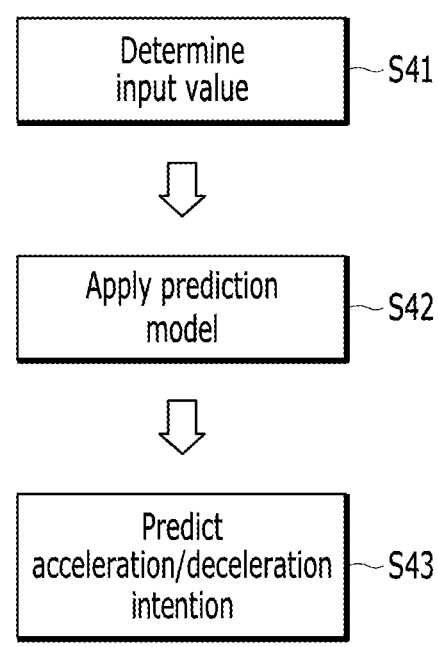
FIGS. 4A and 4B illustrate an exemplary process of predicting a driver's intention of accelerating/decelerating.
Figure 4B:
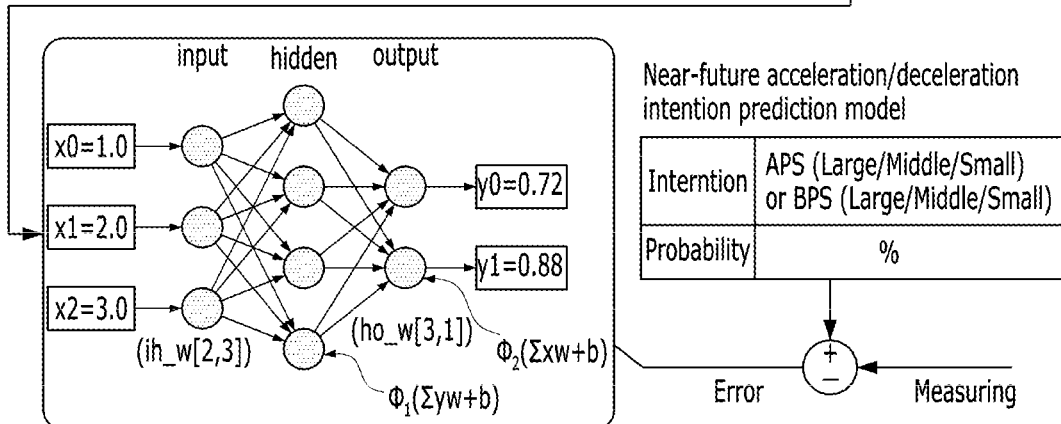

FIGS. 4A and 4B illustrate an exemplary process of predicting the driver's intention of accelerating/decelerating.

First, referring to FIG. 4A, the process of predicting the driver's intention of accelerating/decelerating, which is performed by the driver acceleration/deceleration prediction unit 130, may include the following three steps. First, it may be determined what parameters are used as input values for prediction (S41). The determined input values modify a prediction model through the machine learning (S42).

Acceleration or deceleration is determined through the input values and the modified model, and a predictive value pertaining to the near-future situation is calculated (S43).

The step (S41) of determining the input values may include: 1) a step of extracting candidate values of the input values; 2) a step of preprocessing data by integrating the input signals; and 3) a step of selecting final parameters using the preprocessed candidate values.

Meanwhile, a time-series-model-based method or a deep-learning-based method may be used as the machine-learning scheme. Examples of the time-series-model-based method include an autoregressive integrated moving average (ARIMA) method, which represents variation in action with time using stochastic indicators, and a multi-layer perceptron (MLP) method, which uses a nonparametric regression method for a universal approximator. Examples of the deep-learning-based method include a stacked autoencoder (SAE) method, which makes input and output data similar to each other through dimension reduction, a recurrent-neural-networks (RNNs) method, which is a neural network algorithm for processing sequential information, and a long-short-term memory (LSTM) method, which is suitable for long-term dependent learning. The process of predicting the driver's intention of accelerating/decelerating in the near future, which is performed by the driver accelerating/decelerating prediction unit using a neural network algorithm, among the above learning schemes, is illustrated in FIG. 4B.

Referring to FIG. 4B, the driver acceleration/deceleration prediction unit 130 in some forms of the present disclosure includes a neural network, which learns an acceleration/deceleration prediction model based on a driver's driving style utilizing the machine-learning scheme.

It is preferable that a near-future acceleration/deceleration prediction model based on driving style, which is generated utilizing the neural network based on big data accumulated through test driving before the vehicle is released for sale, be prestored in the driver acceleration/deceleration prediction unit 130.

Further, the driver acceleration/deceleration prediction unit 130 may add vehicle movement data, learned from an actual driver's driving operation after the vehicle is sold to the driver, to the near-future acceleration/deceleration prediction model based on driving style, which has been prestored therein utilizing the neural network, and may therefore generate a near-future acceleration/deceleration prediction model based on driving style, which is specialized for the actual driver. At this time, in accordance with the determination of the actual driver's style (e.g. mild, normal or sporty), the driver acceleration/deceleration prediction unit 130 may apply the learned movement data to the near-future acceleration/deceleration prediction model that corresponds to the determined driving style.

The driver acceleration/deceleration prediction unit 130 may calculate a near-future acceleration/deceleration intention predictive value depending on the driver's driving style on the basis of input information including a driving environment and the driver's driving style, which are determined based on the vehicle speed, radar information and navigation information. Here, the driving style, as shown in FIG. 4B, may be classified into a plurality of types, and may be represented by numerical values of an average vehicle speed, variation in use of the accelerator dAPS, and variation in use of the brake pedal dBPS.

Further, the driver acceleration/deceleration prediction unit 130 may modify the driver acceleration/deceleration model in real time through the machine-learning scheme in the state of being installed to the vehicle, or may be used only for the prediction without learning by receiving a modified model from outside.

That is, in the case in which the modification of the model is performed outside, the parameters, which are input values for learning, are transmitted to a telematics center or a cloud server. Therefore, the modification of the model through learning is performed outside, and only the final model is then transmitted to the vehicle.

Meanwhile, in some forms of the present disclosure, the process of predicting the near-future driving pattern in the hybrid vehicle may include learning and modeling, which are performed in consideration of a driver's style and upcoming events. That is, the driver acceleration/deceleration prediction unit in some forms of the present disclosure learns a prediction model through various input signals, which are illustrated in FIG. 4A, and classifies prediction results in accordance with the driving style with respect to upcoming events. Accordingly, the driver acceleration/deceleration prediction unit determines which driving style corresponds to the upcoming event on the basis of driving information (that is, input signals), which is obtained during traveling, and generates an acceleration/deceleration prediction result corresponding to the upcoming event.

Figure 5:
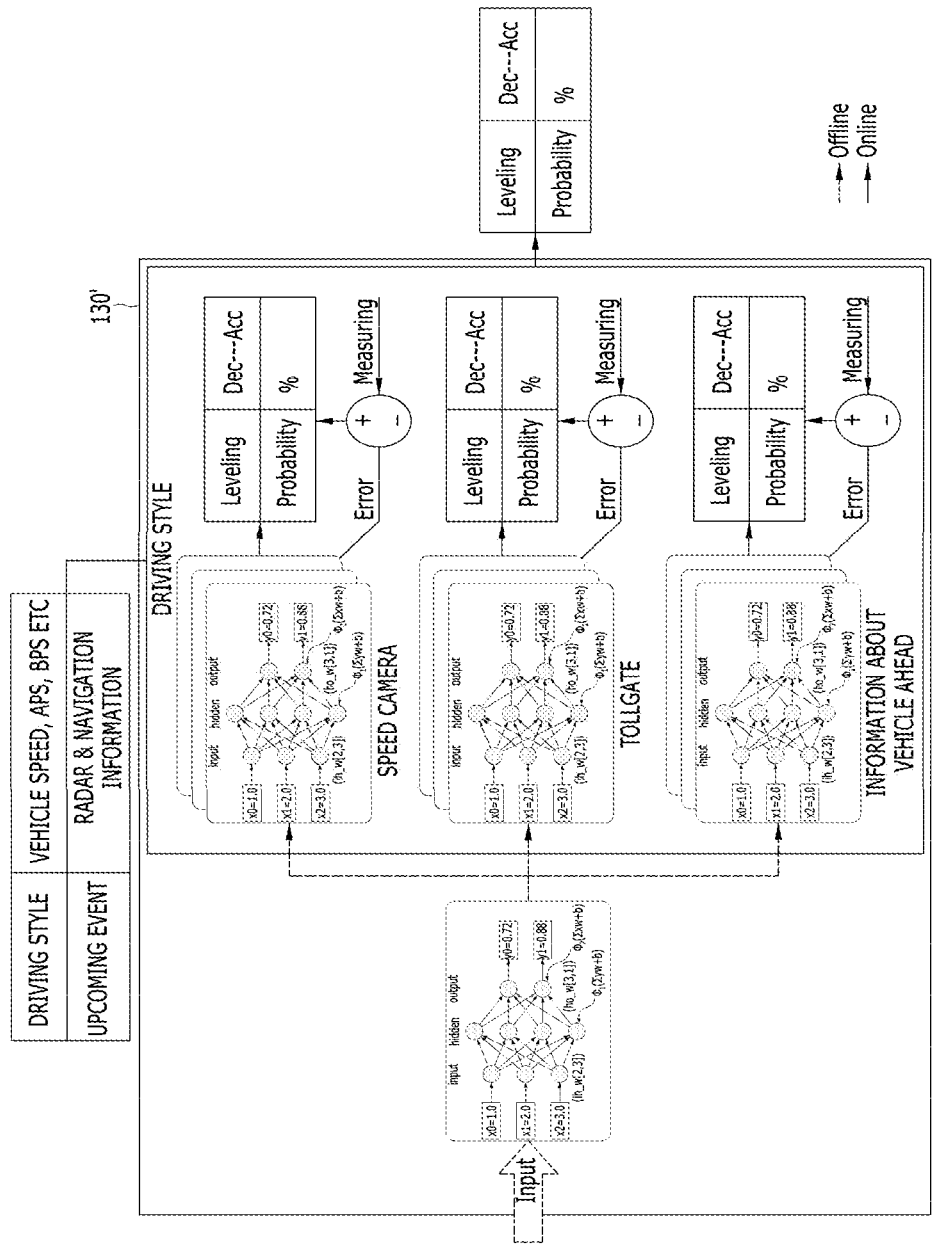
FIG. 5 illustrates an exemplary near-future prediction process that is performed by a driver acceleration/deceleration prediction unit.

The operation of the driver acceleration/deceleration prediction unit to achieve the above is illustrated in FIG. 5.

FIG. 5 illustrates an exemplary near-future prediction process that is performed by the driver acceleration/deceleration prediction unit in some forms of the present disclosure.

Referring to FIG. 5, the driver acceleration/deceleration prediction unit 130' in some forms of the present disclosure separates learning and prediction, that is, 1) classifies prediction results in accordance with driving style with respect to upcoming events based on learning through sampling of the past, and 2) determines the driver's style with respect to the upcoming event based on the current driver's driving information.

For example, the style that the driver has shown with respect to a speed camera, a tollgate, and the state of a vehicle ahead are learned, and a plurality of prediction models is prepared in accordance with events and the driver's style. It is determined which one of the prepared prediction models is to be applied based on the upcoming event and the current driver's driving information, and the acceleration/deceleration prediction result that is derived from the model corresponding to the current driving information is output from the driver acceleration/deceleration prediction unit 130'. This will now be described in detail with reference to the flowchart in FIG. 6.

Figure 6:
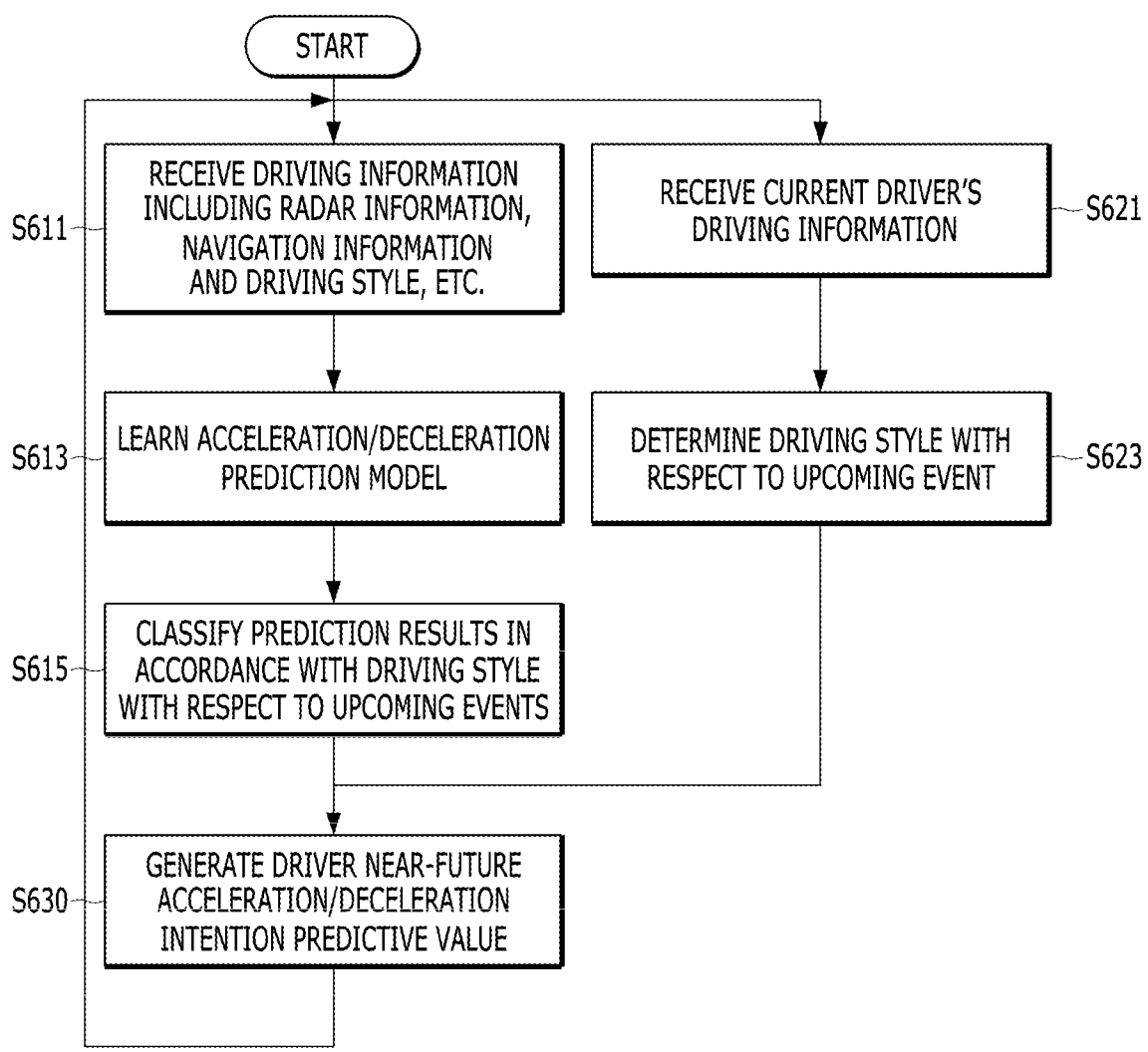
FIG. 6 is a flowchart illustrating an exemplary near-future prediction process that is performed by the driver acceleration/deceleration prediction unit.

FIG. 6 is a flowchart illustrating an exemplary near-future prediction process that is performed by the driver acceleration/deceleration prediction unit in some forms of the present disclosure.

Referring to FIG. 6, the driver acceleration/deceleration prediction unit 130' receives driving information that is detected by the driving information detection unit 110 (S611), learns acceleration/deceleration prediction models (S613), and classifies prediction results in accordance with driving style with respect to upcoming events (S615). Based on the learned models, the driver acceleration/deceleration prediction unit 130' receives the current driver's driving information (S621), determines the model to which the driving style with respect to the upcoming event corresponds (S623), and outputs a predictive value of the corresponding model as a driver near-future acceleration/deceleration intention predictive value (S630).

Figure 7:
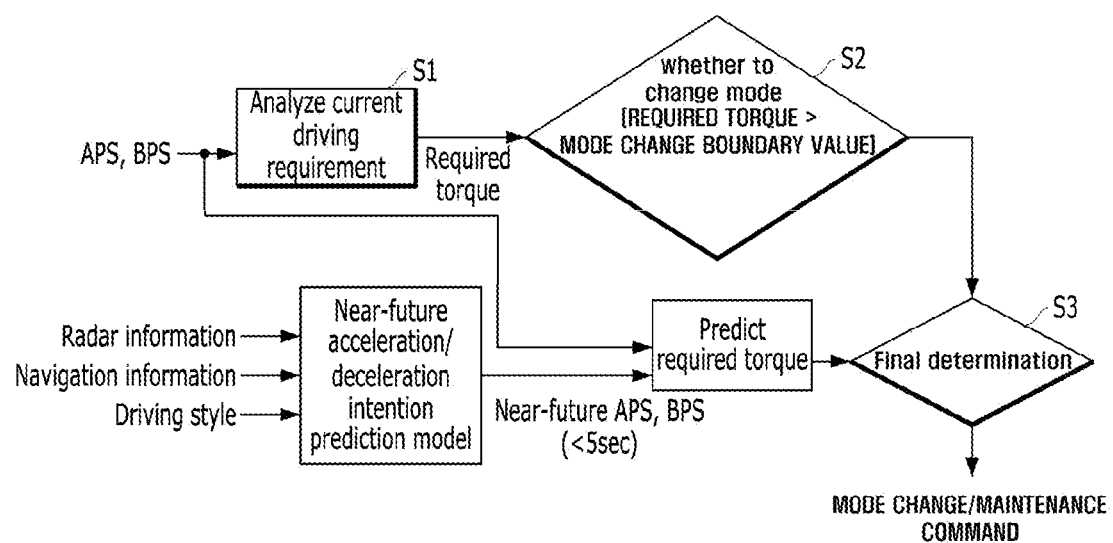
FIG. 7 illustrates a mode change determination method using a near-future acceleration/deceleration prediction model.

FIG. 7 illustrates a mode change determination method using the near-future acceleration/deceleration prediction model in some forms of the present disclosure.

The mode change in FIG. 7 may be a change between the EV mode and the HEV mode, a change between a current gear stage of the transmission and a higher gear stage thereof, or a change between a full-load operation mode of the engine and a partial-load operation mode thereof. In an example, in the state of driving in the EV mode, although it is analyzed that the current driving mode additionally requires the driving force of the engine, if it is predicted at that time that the driving force of the engine will not be necessary in the near future, the EV mode may be maintained without change to the HEV mode. In another example, although it is analyzed that the current driving mode requires a torque larger than the maximum torque of the current gear stage, if it is predicted at that time that the required torque will be decreased soon in the near future, the torque may be adjusted to the required level through a margin torque of the motor while maintaining the current gear stage. If it is predicted that the required torque will be further increased in the near future, shifting to a higher gear stage may be performed beforehand.

In FIG. 7, for convenience of explanation, although the factors to be determined and predicted are limited to a required torque and switching of modes (change of speed and engine operation modes) related to the required torque, it will be apparent to those skilled in the art that other predictive values such as acceleration can also be factors to be determined and predicted. In this case, the driver acceleration/deceleration prediction unit may calculate a predictive acceleration value using a near-future acceleration/deceleration predictive value.

Referring to FIG. 7, the HCU 140 in some forms of the present disclosure analyzes a current driving requirement in response to the operation of the APS or the BPS, caused by the driver, and calculates a required torque (S1). In addition, the HCU 140 compares a mode-change boundary value with the required torque (S2).

The HCU 140 determines whether to change a mode by additionally applying a required torque predictive value in accordance with driver acceleration/deceleration intention predictive information, generated by the driver acceleration/deceleration prediction unit 130' using the near-future acceleration/deceleration prediction model, to the comparison result between the mode-change boundary value and the required torque (S3), and transmits a command corresponding to the determination result to the control unit corresponding thereto. For example, on the assumption that the mode-change boundary value in the step S2 is referred to as a first threshold value and the reference value for comparison in the step S3 is referred to as a second threshold value, the second threshold value may be equal to or less than the first threshold value.

The above-described form of present disclosure may be implemented by a computer-readable code in a computer-readable recording medium. The computer-readable recording medium includes all kinds of recording devices in which data readable by a computer system is stored. Examples of the computer-readable recording medium include a hard disk drive (HDD), a solid state disk (SSD), a silicon disk drive (SDD), a ROM, a RAM, a CD-ROM, a magnetic tape, a floppy disk, an optical data storage device, and so on. The computer-readable recording medium may also be implemented in the form of carrier waves (e.g. transmission via the Internet).

As is apparent from the above description, a hybrid vehicle associated with at least one of the forms of the present disclosure having the above-described construction has the effect of predicting a driving pattern more efficiently.

Particularly, in the driving pattern prediction using a machine-learning scheme, since learning and modeling are performed in accordance with driving style with respect to upcoming events, the prediction result may be improved.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:
1. A hybrid vehicle comprising:
a driving information detection unit configured to detect, with at least one sensor, driving information based on traveling of the hybrid vehicle;
an acceleration/deceleration prediction unit configured to generate an acceleration/deceleration prediction value based on the driving information utilizing an acceleration/deceleration prediction model and traveling conditions of the hybrid vehicle,
wherein the acceleration/deceleration prediction unit is configured to:

determine an upcoming event and a driving style based on current vehicle driving information detected by the driving information detection unit; and generate the acceleration/deceleration prediction value based on a prediction model, wherein the prediction model corresponds to the upcoming event and the driving style selected from a plurality of pre-learned prediction models; and a hybrid control unit configured to control a sub-control unit, wherein the sub-control unit is configured to:

determine a first torque based on information transmitted from the driving information detection unit, wherein the first torque is a torque currently required;

determine a second torque based on the acceleration/deceleration prediction value, wherein the second torque is a torque to be required in a near future;

when it is determined that the first torque is equal to or greater than a first threshold value, compare the second torque with a second threshold value; and when it is determined that the second torque is equal to or greater than the second threshold value, change a drive mode from a first mode to a second mode.

2. The hybrid vehicle according to claim 1, wherein the acceleration/deceleration prediction unit is configured to:

generate acceleration/deceleration prediction models based on past vehicle driving information; and classify each acceleration/deceleration prediction model into a corresponding part based on the upcoming event and the driving style.

3. The hybrid vehicle according to claim 1, wherein the current vehicle driving information and the past vehicle driving information comprise at least one of radar information, navigation information, or driving style information.

4. The hybrid vehicle according to claim 3, wherein the driving style information comprises at least one of a vehicle speed, a value of an accelerator position sensor, or a value of a brake pedal sensor.

5. The hybrid vehicle according to claim 1, wherein the acceleration/deceleration prediction value is output in a form of a magnitude and a probability of the value of the accelerator position sensor or the value of the brake pedal sensor.

6. The hybrid vehicle according to claim 1, wherein the sub-control unit is configured to:

when it is determined that the first torque is less than the first threshold value or that the second torque is less than the second threshold value, maintain the first mode.

7. The hybrid vehicle according to claim 1, wherein the second threshold value is equal to or less than the first threshold value.

8. The hybrid vehicle according to claim 1, wherein:

the first mode comprises at least one of a mode of maintaining a gear stage, an EV mode, or a partial operation mode of an engine; and the second mode comprises at least one of a mode of changing to a higher gear stage, an HEV mode, or a full operation mode of the engine to correspond to the first mode.

9. A method of predicting a driving pattern in a hybrid vehicle, the method comprising:

determining a currently required torque;

determining a predictive acceleration expected to be required in a near future;

when it is determined that the currently required torque is equal to or greater than a first threshold value and that the predictive acceleration is equal to or greater than a second threshold value, changing a drive mode from a first mode to a second mode; and when it is determined that the currently required torque is less than the first threshold value or that the predictive acceleration is less than the second threshold value, maintaining the first mode, wherein determining the predictive acceleration further comprises:

acquiring current vehicle driving information;

determining an upcoming event and a driving style based on the current vehicle driving information;

generating an acceleration/deceleration prediction value based on a prediction model, wherein the prediction model corresponds to the upcoming event and the driving style selected from among a plurality of pre-learned prediction models; and determining the predictive acceleration based on the acceleration/deceleration prediction value.

* * * * *